March 31, 1925.
R. C. MATHES
1,531,805
OSCILLATION GENERATOR
Filed July 10, 1920
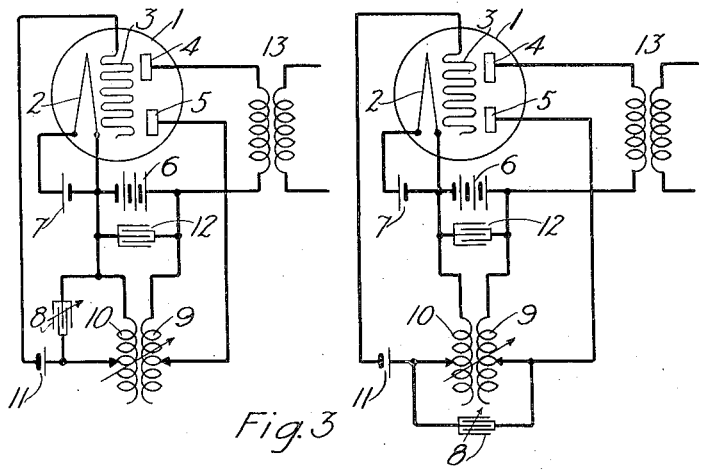
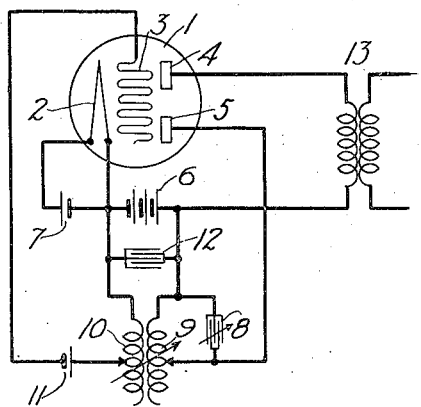
Inventor:
Robert C. Mathes
by C. A. Sprague, Atty.

Patented Mar. 31, 1925.

1,531,805

UNITED STATES PATENT OFFICE.

ROBERT C. MATHES, OF NEW YORK, N. Y., ASSIGNOR TO WESTERN ELECTRIC COMPANY, INCORPORATED, OF NEW YORK, N. Y., A CORPORATION OF NEW YORK.

OSCILLATION GENERATOR.

Application filed July 10, 1920. Serial No. 395,325.

*To all whom it may concern:*

Be it known that I, ROBERT C. MATHES, a citizen of the United States, residing at New York, in the county of Bronx, State of New York, have invented certain new and useful Improvements in Oscillation Generators, of which the following is a full, clear, concise, and exact description.

This invention relates to a method and means for operating an oscillation generator.

Regenerative operation of electric discharge devices as oscillation generators by means of a coupling or feed-back connection from the output circuit to the input circuit of such devices has been proposed, but in general the feed-back connection is subject to the reactions of the impedances of the output or load circuit. This leads to inconstancy of the voltage fed back, hence change in frequency of the energy supplied to the load circuit and lack of stable operation of the generator.

An object of the invention is to provide a generator having a feed-back connection from the output to the input circuit thereof which is not subject to the reaction of the impedance of the output circuit.

Another object is to secure a feed-back connection which may be controlled independently of the impedances of the output or load circuit.

A further object is to stabilize the operation of the generator.

An additional object is to provide a generator which may have different voltage amplification ratios and internal impedances in the feed-back and load circuits respectively.

Still another object is the production of a purer final wave form or purer frequencies, in other words, the maintenance of a more constant frequency than has been possible heretofore in oscillation producing devices including a feed-back coupling, since by the use of a sharply tuned oscillatory circuit, a final output wave practically free of harmonics is obtained.

One method of accomplishing the objects outlined above and others which will appear as the nature of the invention is more fully set forth, comprises the use of an electric discharge device or thermionic tube having a cathode, a control element or grid, and a pair of plates or anodes, one of the anodes being connected by a feed-back coupling to the input circuit of the tube while the other anode is connected to the output or load circuit.

In operation a pair of electron streams are established between the cathode and anodes, one of which functions to supply energy through the feed-back coupling to the circuit of the control element and thereby controls the energy in the other streams which is adapted to supply the load circuit.

For a complete understanding of the invention, reference is made to the accompanying drawings in which Fig. 1 shows a simple form of the invention; Figs. 2 and 3 are slightly modified arrangements of this simple form.

Like reference characters are used to identify the like elements in all the figures of the drawings.

Referring to Fig. 1 a thermionic tube 1 is provided with a filament 2, a control element or grid 3, and a pair of plates or anodes 4 and 5. A source of voltage 7 supplies heating current to the filament 2. The input circuit may be traced from the grid 3, the closed circuit comprising the condenser 8 and secondary winding 10 of the coupling connection to the cathode 2. One branch of the output circuit may be traced from the anode 5, the primary winding 9 of the coupling, one of the terminals of the battery 6, and from the other terminal of this battery to the cathode 2. The second branch of the output circuit extends from the anode 4 to and through the primary winding of the load circuit connecting device 13, thence to the battery 6 and from there to the cathode 2.

The coils 9 and 10 may be adjustable both as to their inductance and mutual coupling and the coupling should be, at all times, sufficiently close to produce " singing."

Coil 10 and the adjustable capacity 8 connected across its terminals constitute a closed oscillatory circuit, the natural period of which may be varied as desired, thereby controlling the frequency of the energy supplied to the input circuit. Battery 6 is adapted to supply separate space currents between the electrodes 2 and 4 and 5 respectively. A capacity 12 shunting the battery 6 supplies a low impedance path for the oscillations returned to the input circuit from one branch of the output circuit. Grid 3 may be maintained at a negative potential relatively to the cathode 2 by the battery 11.

In Fig. 2, the adjustable condenser 8 is shown connected across the terminals of the coupling coils 9 and 10 to constitute the oscillatory circuit.

In Fig. 3, the condenser 8 is in shunt to the coil 9, but in every other respect the disclosure is the same as in Fig. 2. Thus, the closed circuit 8, 9, 12, 10 of Fig. 2, or 8, 9, of Fig. 3, constitutes the oscillatory circuit which determines the frequency of the energy supplied to the input circuit of the device. If a sharply tuned oscillatory circuit is used, it is found that the output wave will be practically free of harmonics.

The spatial relation of the anodes 4 and 5 relatively to the cathode is a matter of choice and will depend upon whether the same voltage amplification ratio is desired in the feed-back connection and load circuit or a greater or lesser ratio in the former than in the latter. Since the internal impedance of the feed-back and load circuits respectively is dependent upon the distance of the respective anodes from the cathode, it will be seen that in a generator having anodes at different distances from the cathode, as in Fig. 1, the internal impedance of the space current paths will be different. Difference in the relative areas of the two anodes may also be used to vary this relation. This is shown in Fig. 2, wherein the anode 4 is of greater area than the anode 5, but the reverse may be the case, that is, the anode 5 may be of greater area than the anode 4, depending upon the result desired, as stated above.

By designing the discharge device as described above and shown in Figs. 1 and 2, the energy required to maintain the tube in an oscillating or "singing" condition may be reduced to a minimum, since a smaller portion of the energy supplied by the source 6 will be used for this purpose. Again, since this arrangement may employ a greater amplification ratio for the path supplying the feed back circuit, it is possible to utilize the electron emisson of the cathode to the best advantage, for the reason that fewer electrons are employed for controlling the operation of the tube and hence a larger number are available in the space path supplying energy to the load circuit.

Owing to the fact that the portions of the energy supplied to the outgoing line or load circuit and that flowing through the feed-back connection are derived from the separate space current paths within the tube and their external circuits are not connected, it is obvious that the energy fed back to the input circuit is not subjected to the reactions of the impedance of the load circuit and that the coupling may be adjusted independently of such impedances. The frequency of the feed-back energy is therefore undisturbed by changes in the load. As the voltage in the input circuit being that developed across the sharply tuned oscillating circuit is freer from harmonics than any voltage developed elsewhere in the circuit arrangement and as this voltage is applied to control the load current flowing through the second anode circuit, the wave form supplied to the load may be made purer than in the case where the load current is derived from the anode circuit coupled to the oscillating circuit. The reason for this is that under the physical conditions obtaining during the generation of oscillations, the feed-back circuit is overloaded and the amplitude of the oscillating current extends beyond the linear operating characteristic of the vacuum tube whereas the load circuit branch may be so related to the rest of the system that overloading does not take place.

While specific forms of the oscillation generator including a vacuum tube has been illustrated and described, it is to be understood that this invention is not to be construed as limited to the specific means and circuit arrangements disclosed, but includes all such modifications as fall within the scope of the appended claims.

What is claimed is:

1. A method of operating an oscillation generator which embodies an electric discharge device having a plurality of space discharge paths, and a circuit system including a plurality of output circuits, an input circuit and frequency determining means associated with the device, which comprises predetermining different inherent electrical characteristics for the discharge paths, whereby the energies supplied through said paths are amplified to different degrees, supplying energy through one of said paths to control regenerative operation of the device and supplying a load circuit through the other discharge path.

2. A method of operating an oscillation generator which embodies an electric discharge device having a plurality of space discharge paths, and a circuit system including a plurality of output circuits, an input circuit and frequency determining means associated with the device, which comprises impressing the same voltage upon the discharge paths, predetermining different electrical characteristics for said discharge paths independently of the voltage supplied thereto, supplying energy through one of said paths to control regenerative operation of the device, and supplying a load circuit through the other discharge path.

3. A method of operating an oscillation generator which embodies an electric discharge device having a plurality of space discharge paths, and a circuit system including a plurality of output circuits, an input circuit and frequency determining means associated with the device, which comprises differently impeding the current flow through said space paths, supplying energy through one of said paths to control regenerative operation of said device and supplying a load circuit through the other discharge path.

4. An oscillation generator comprising an electric discharge device having a plurality of space discharge paths of different impedances, means for supplying energy through one path to control regenerative operation of said device and means for supplying a load circuit through the other path.

5. An oscillation generator comprising an electric discharge device having a plurality of discharge paths of different impedances, an output circuit connected to a path of definite impedance, an input circuit coupled thereto, a second output circuit connected to another path of definite but different impedance and a load circuit supplied by said second output circuit.

6. An oscillation generator comprising an electric discharge device having a plurality of discharge paths of different impedances, an output circuit associated with each path, an input circuit, means for causing one of said output circuits to react upon the input circuit, means to determine the frequency of the energy fed back and means to supply a load circuit from the other output circuit.

7. An oscillation generator comprising an electric discharge device, a cathode, a plurality of anodes, a control element, means within the device for determining different amplifying characteristics for the paths from the cathode to said anodes, an output circuit associated with each of the anodes, an input circuit associated with the control element, means coupling one of said output circuits with the input circuit, means for determining the frequency of the energy thereby supplied to the control element, and means for coupling the other output circuit to a load circuit.

8. An oscillation generator comprising an electric discharge device having an electron emitter, a plurality of anodes, a control element, means within the device for determining different impedance values for the paths from the cathode to said anodes, an output circuit associated with each of the anodes, an input circuit associated with the control element, means coupling one of said output circuits with the input circuit, means for determining the frequency of the energy supplied to the control element and means for coupling the other output circuit to a load circuit.

In witness whereof, I hereunto subscribe my name this 29th day of June A. D., 1920.

ROBERT C. MATHES.